US008948026B2

(12) United States Patent
Rhee et al.

(10) Patent No.: US 8,948,026 B2
(45) Date of Patent: *Feb. 3, 2015

(54) USER-PREFERENCE-BASED DSL SYSTEM

(75) Inventors: Wonjong Rhee, Palo Alto, CA (US);
John M Cioffi, Atherton, CA (US);
Georgios Ginis, San Francisco, CA (US); Peter J. Silverman, Evanston, IL (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 2113 days.

This patent is subject to a terminal disclaimer.

(21) Appl. No.: 11/342,023

(22) Filed: Jan. 28, 2006

(65) Prior Publication Data
US 2006/0280236 A1 Dec. 14, 2006

Related U.S. Application Data

(60) Provisional application No. 60/689,421, filed on Jun. 10, 2005, provisional application No. 60/698,113, filed on Jul. 10, 2005.

(51) Int. Cl.
*H04B 1/38* (2006.01)
*H04L 12/28* (2006.01)
(Continued)

(52) U.S. Cl.
CPC ........ *H04L 12/2856* (2013.01); *H04L 12/2874* (2013.01); *H04L 12/289* (2013.01);
(Continued)

(58) Field of Classification Search
USPC ........................... 375/219–223; 370/241–253; 709/223–226
See application file for complete search history.

(56) References Cited

U.S. PATENT DOCUMENTS 5,465,321 A * 11/1995 Smyth .............................. 706/20
6,067,565 A * 5/2000 Horvitz ......................... 709/218
(Continued)

FOREIGN PATENT DOCUMENTS

WO WO-03/003811 1/2003
WO WO/03/003811 1/2003

OTHER PUBLICATIONS

ITU-T Rec G.992.3, Jul. 2002, pp. 15-16.*
(Continued)

*Primary Examiner* — Thai Nguyen
(74) *Attorney, Agent, or Firm* — Blakely, Sokoloff, Taylor & Zafman

(57) ABSTRACT

Operator-controlled implementations of user preferences are provided when feasible. User preference data is obtained by the operator and compared to operational characteristics and parameters of a communication system, such as a DSL system, to determine whether one or more of the user preferences can be implemented in the communication system. When implementation of a user preference would violate operational rules of the system, or where implementation would adversely affect system operation, the preference need not be implemented. However, when a user preference can be implemented in the system without causing problems, the operator can implement (or permit another party to implement) the user preference to effect the user's desires. The user preference data can be obtained directly from users (for example, by surveys and other direct user feedback) or can be obtained indirectly (for example, by constructing a Hidden Markov Model that shows user preferences). The operator may collect the user preference data from a user set (for example, a single user or a plurality of users). The user preference data can be compared to 2 or more performance metrics that can be adjusted, to the extent feasible, to implement the user preference data.

20 Claims, 8 Drawing Sheets

(51) Int. Cl.
*H04M 11/06* (2006.01)
*H04L 29/08* (2006.01)
*H04L 29/06* (2006.01)

(52) U.S. Cl.
CPC .......... *H04M 11/062* (2013.01); *H04L 67/306* (2013.01); *H04L 69/24* (2013.01)
USPC ........................................................ 370/252

(56) References Cited

U.S. PATENT DOCUMENTS

| | | | |
|---|---|---|---|
| 6,374,288 B1 * | 4/2002 | Bhagavath et al. ............ | 709/203 |
| 6,819,746 B1 * | 11/2004 | Schneider et al. ......... | 379/29.01 |
| 6,829,250 B2 | 12/2004 | Voit et al. | |
| 6,928,068 B1 * | 8/2005 | Crowe et al. .................. | 370/352 |
| 7,568,045 B1 | 7/2009 | Agrawal | |
| 2002/0044567 A1 | 4/2002 | Voit et al. | |
| 2002/0093985 A1 * | 7/2002 | Nimmagadda ............... | 370/493 |
| 2005/0123027 A1 | 6/2005 | Cioffi et al. | |
| 2005/0288029 A1 | 12/2005 | Jacobsen | |

OTHER PUBLICATIONS

European Patent Office, "First Examination Report", European Application No. 06710587.4, (May 30, 2008).
International Searching Authority, "International Search Report and Written Opinion", International Application No. PCT/IB2006/00658, (Jul. 23, 2007).
Non-Final Office Action for U.S. Appl. No. 11/342,003, mailed Apr. 17, 2009, 23 pgs.
International Search Report & Written Opinion for PCT Application No. PCT/IB2006/000771, mailed Aug. 1, 2009, 15 pgs.
International Preliminary Report on Patentability for PCT Application No. PCT/IB2006/000771, mailed Dec. 27, 2007, 11 pgs.
International Preliminary Report on Patentability for PCT Application No. PCT/IB2006/000658, mailed Dec. 27, 2007, 11 pgs.
Final Office Action for U.S. Appl. No. 11/342,003, Mailed Sep. 29, 2009, 20 Pages.
Non-Final Office Action for U.S. Appl. No. 11/342,003, Mailed Jan. 13, 2010, 21 pages.
Final Office Action for U.S. Appl. No. 11/342,003, Mailed Jun. 28, 2010, 17 pgs.
First Official Action for Australian Patent Application No. 2006256483, Mailed Feb. 1, 2010, 3 pgs.
Non-Final Office Action for China Application No. 20068027103.0 mailed Aug. 30, 2010, 17 Pages.
Non-Final Office Action for China Patent Application No, 200680027629.9, mailed Sep. 14, 2010, 7 Pages.
Non-Final Office Action for European Patent Application No. 06727414.2 mailed Sep. 7, 2010, 5 Pages.

* cited by examiner

USER-PREFERENCE-BASED DSL SYSTEM

CROSS-REFERENCE TO RELATED APPLICATIONS

This application claims the benefit of priority under 35 U.S.C. §119(e) of the following:

U.S. Provisional Ser. No. 60/689,421 filed on Jun. 10, 2005, entitled OPERATOR-CONTROLLED USER-PREFERENCE-BASED XDSL SYSTEM, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

DSL systems are configurable to a degree that allows certain trade-offs among and between performance aspects of such DSL systems. Thus, the configuration of a DSL system often has an effect on customers' satisfaction in their use of the DSL service. DSL systems have not been capable of obtaining, recording, evaluating and/or implementing the performance aspects that are most significant to customers (users) and determining how a DSL system should be configured to accommodate such preferences.

Systems, apparatus, methods and techniques that provide improvements for identifying DSL system user preferences and for configuring that DSL system to satisfy the identified user preferences would represent a significant advancement in the art. Also, systems, apparatus, methods and techniques for implementing such user preference assessment and DSL system configuration likewise would represent a significant advancement in the art.

BRIEF SUMMARY

Embodiments of the present invention provide operator-controlled implementations of user preferences when feasible. A DSL system operator (such as a telco CLEC or ILEC) is able to define, limit, set and control the "operational space" of the system, where the "operational space" includes the rules, permitted uses, characteristics, operational parameter ranges, etc. that define how users can use such a system. Using the present invention, user preference data is obtained by the operator and compared to the operator-defined operational space of a communication system, such as a DSL system, to determine whether one or more of the user preferences can be implemented in the system. When implementation of a user preference would violate operational rules of the system, or where implementation would adversely affect system operation, the preference need not be implemented. However, when a user preference can be implemented in the operational space of the system without causing problems, the operator can implement (or permit another party to implement) the user preference to effect the user's desires. The user preference data can be obtained directly from users (for example, by surveys and other direct user feedback) or can be obtained indirectly (for example, by constructing a Hidden Markov Model that shows user preferences). The operator may collect the user preference data from a user set (for example, a single user or a plurality of users). The user preference data can be compared to 2 or more performance metrics that can be adjusted, to the extent feasible, to implement the user preference data.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
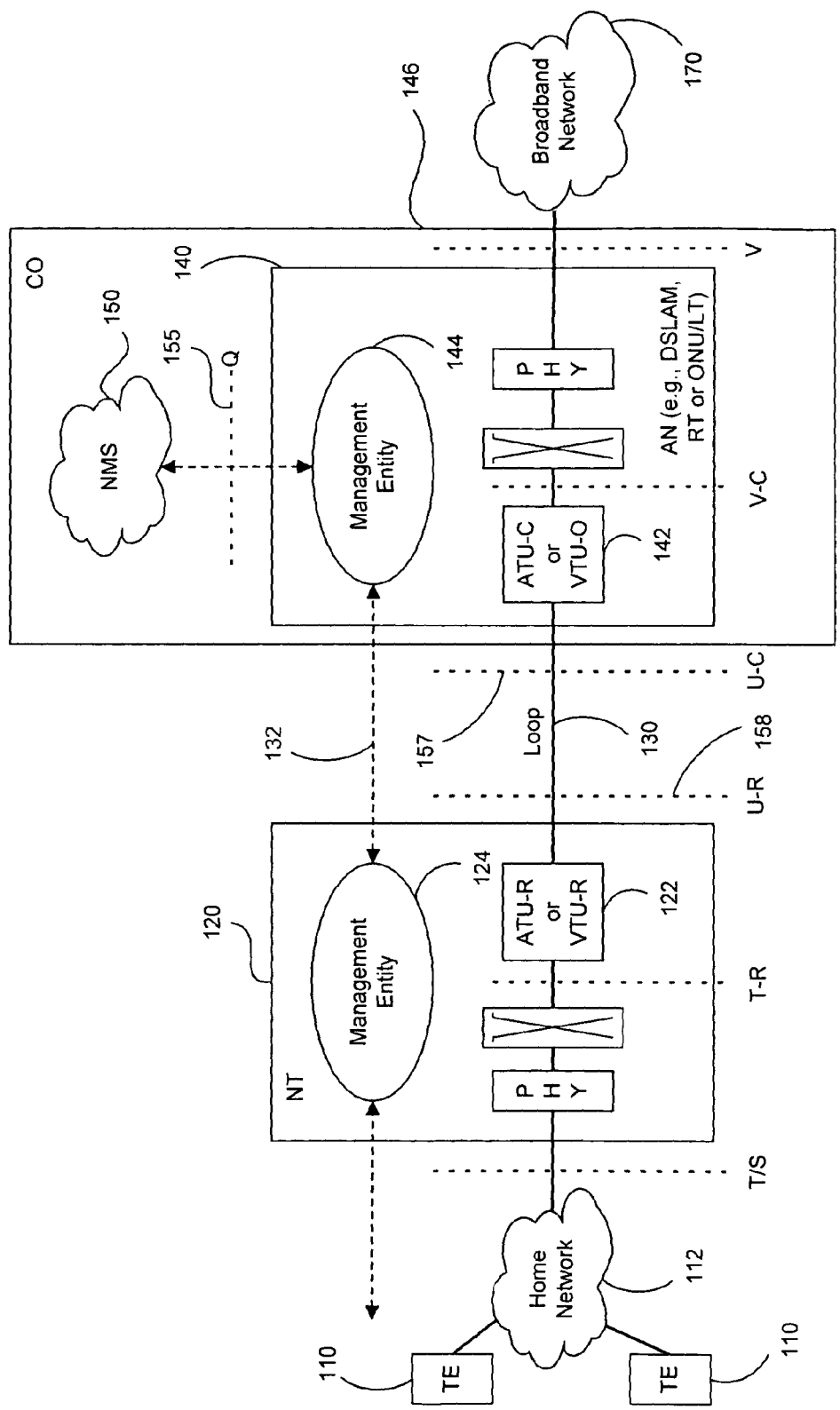
FIG. 1 is a schematic block reference model system per the G.997.1 standard applicable to various DSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) such as equipment directly connected to a modem, LT device, DSLAM or other communication system device, thus creating a "smart" modem. In addition, as will be appreciated by those skilled in the art, the controller may be coupled to any other type of data transmission system in which the present invention would be useful. The phrases "coupled to" and "connected to" and the like are used herein to describe a connection between two elements and/or components and are intended to mean coupled either directly together, or indirectly, for example via one or more intervening elements or via a wireless connection, where appropriate. Moreover, references to a "communication system" also are intended, where applicable, to include reference to any other type of data transmission system.

Some of the following examples of embodiments of the present invention will be used in connection with ADSL and/or VDSL systems as exemplary data transmission systems. Within these DSL systems, certain conventions, rules, protocols, etc. may be used to describe operation of the exemplary DSL system and the information and/or data available from users of and/or equipment coupled to the system. However, as will be appreciated by those skilled in the art, embodiments of the present invention may be applied to various types of data transmission systems, and the invention thus is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). NMS and EMS systems are considered to be parts of Operations Support Systems (OSS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In this invention, such VTU-O's (or equivalents) are coordinated in terms of transmission (downstream) and reception (upstream) of all or many of the lines terminating on the termination device. Such coordinated transmission reception constitutes a vectored line-termination device. In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Technical Report TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the following discussion of DSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
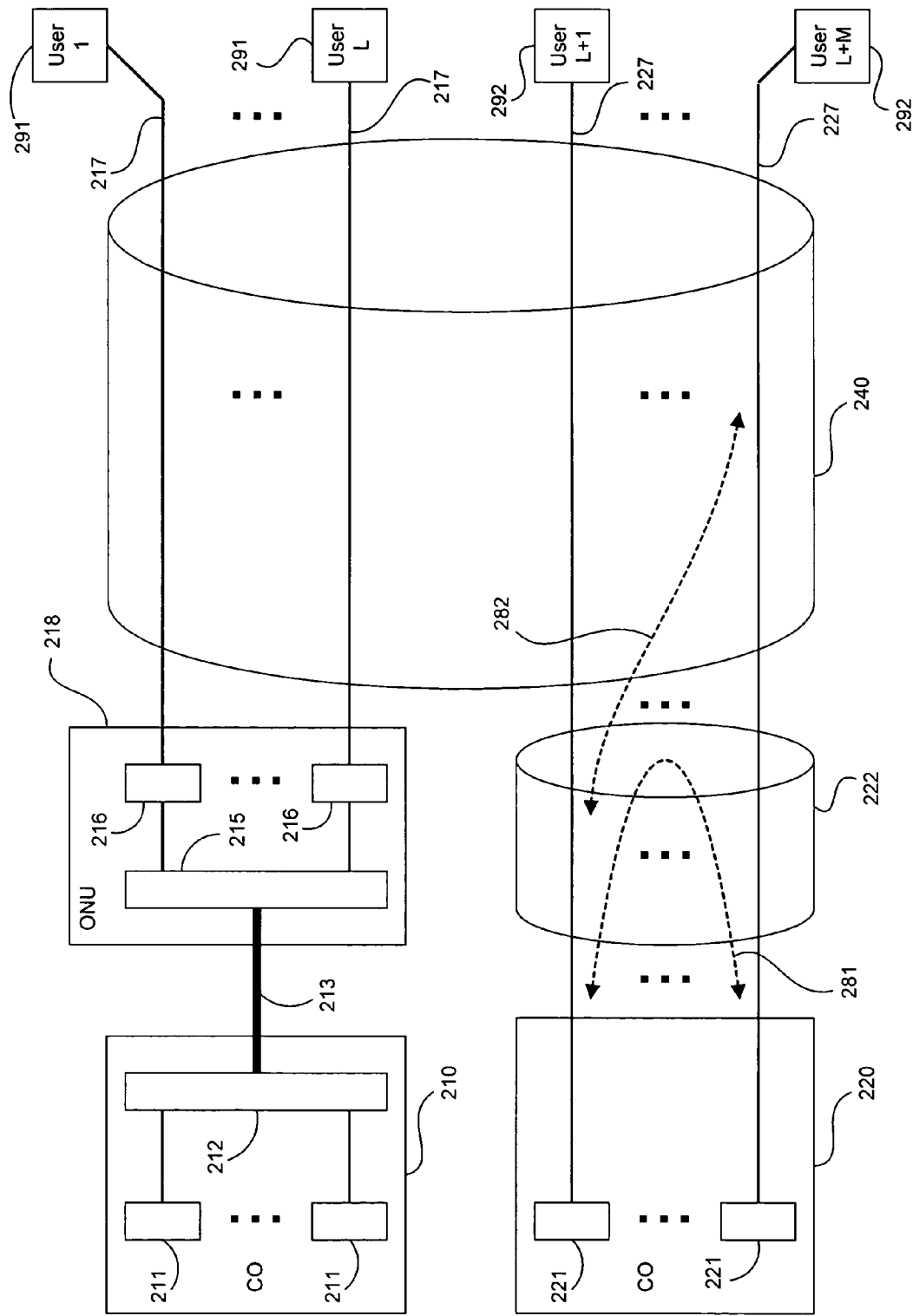
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

It is desirable with some embodiments of the present invention that the lines within a binder terminate on a single line card (on which a vectored DSL chip or device sits or to which such a device is otherwise coupled). There is no guarantee, however, in normal wiring practice that such single-line-card common-binder termination occurs. If it does, crosstalk can be cancelled/exploited with vectoring. The routing of signals can also occur in electronic distribution frames or backplanes, though they can add cost to the overall system. In this way, the line termination ("LT") of VDSL, typically terminating 48, 96 or 192 lines in a neighborhood or building on one or a few line cards, has a relatively good chance of terminating all the lines from a binder on a line card, especially if the telephone company does some work in wiring to ensure such common-card termination.

In a typical communication system, there are numerous tradeoffs among a variety of performance metrics. Typically, evaluation and decisions made about implementation of system operational characteristics and parameters is performed by a service provider or operator of the system, such as telecommunications company (that is, a "telco") or the like (all such centralized system controllers will be referred to herein as "operators"). DSL operators typically control, operate and/or own access nodes in DSL systems. These access nodes can be DSLAMs, RTs, LTs, ONUs and/or any other similar equipment and/or devices.

A DSL system operator (such as a telco CLEC or ILEC) is able to define, limit, set and control (referred to generally as "defining") the "operational space" of the system, where the "operational space" includes the rules, permitted uses, characteristics, operational parameter ranges, etc. that define how users can use such a system. Using the present invention, user preference data is obtained by the operator and compared to the operator-defined operational space of a communication system, such as a DSL system, to determine whether one or more of the user preferences can be implemented in the system. Where feasible or allowed, an operator can implement user preferences that are not in conflict with the operator's operation of the DSL system. Stated another way, the operator can implement those user preferences that fit within the operational space defined and maintained by the operator.

Various operational characteristics and parameters are part of an operator's consideration. These operational characteristics and parameters can include functional attributes of the system (for example, line conditions, external noise, etc.), system implementation (for example, types of DSL service available, limitations imposed by an operator's service plan, etc.) and user service limitations (for example, a user might not be a subscriber to and/or paying not enough to receive a data rate larger than 3 Mbps, user equipment, etc.). For instance, data rate and service stability typically are related inversely in an ADSL or other DSL system, where a higher data rate usually increases the probability of service outages and a lower data rate reduces the probability of such service outages. Operators commonly establish their own broadly applied rules and implement these common rules on all communication links. In embodiments of the present invention, an operator (for example, an DSL service provider) can assess one or more users' preference data and configure one or more lines to implement user preferences to some degree. Users' preferences and user preference data reflecting those preferences can be found directly (for example, via user calls, email surveys, web interface, etc.) or indirectly (for example, based on one or more Hidden Markov Models of user data activity).

Some of the following examples show implementation of embodiments of the present invention for an DSL system where the tradeoff is between two inversely related preferences—a higher data rate (with a higher probability of service outage) and a lower probability of service-outage/modem-retraining (with a lower data rate). Some DSL lines experience degradation caused by a time-varying noise spectrum or by time-varying impulse noise. Such time variation noise directly affects the maximum attainable data rate and/or stability of the lines, where lines experience more unstable service as the noise influence increases. In many situations, this time-varying noise may be other users' crosstalk. Furthermore, when phantom or split-pair circuits are used, some binder capacity can be reallocated on demand to different users as in vectored differential systems, where each line performs as if some of the other lines were not carrying signals anyway. In non-vectored situations, the mutual crosstalk can be a limiting effect in the quality of service and data rates used by any and/or all users.

A DSL modem often operates at a fixed data rate established during training. Any subsequent change in rate or some other operational parameter setting requires a retraining of the modem, which causes a short service outage (for example, 20-60 seconds). These outages can cause user dissatisfaction and/or problems. Where service outage prevention is desirable, lower data rates typically help reduce the frequency of such outages. On the other hand, some users might require and/or desire a high data rate because of the nature of their use, despite any service outages. This second type of user might not interactively use the internet much of time, so that an occasional service outage might be acceptable as long as higher data rates are otherwise preserved.

A first operator strategy (a "high reliability" strategy) might focus on the satisfaction of the first user type and therefore set a very conservative data-rate limit. In such cases, the data rate might be suppressed to 20-30% of the line's average maximum attainable data rate to prevent a few short service interruptions per day (or week). A second operator strategy (a "high rate" strategy) might aim to satisfy the second user type and set data rates higher than would be the case in the first (high reliability) strategy. In the second (high rate) strategy, service outage can occur more frequently for those lines with significant time-variation of the channel because the modem is setting its data rate at the maximum rate possible every time it trains.

Until now, operators have operated with the above-referenced common rules applied to and across all users, failing to consider full user satisfaction and usage needs. Embodiments of the present invention allow an operator to apply different rules to different users and/or user sets based on user preference data (for example, user input or other forms of user preference information like HMM studies). As will be appreciated by those skilled in the art, the present invention can be applied to any communication system. For instance, a wireless service operator might use embodiments of the present invention to configure individual user link parameters that are used to tradeoff coverage area and the battery life. Examples and claims herein may be directed to DSL systems in particular, but the invention is not so limited.

Figure 3:
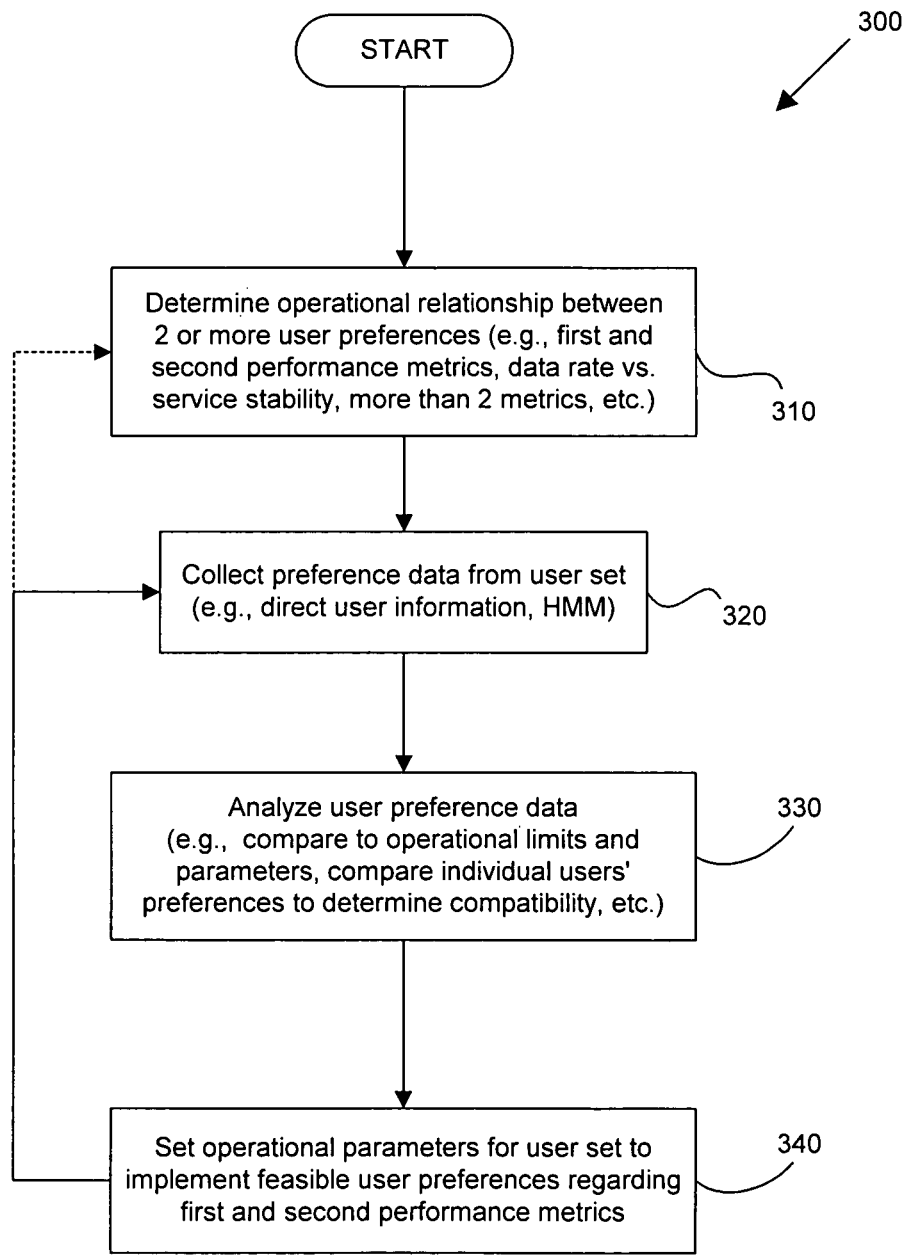
FIG. 3 is a flow diagram of a method according to one or more embodiments of the present invention.

One embodiment of the present invention is method 300, shown in the flow diagram of FIG. 3. An operational relationship between a first performance metric and a second performance metric is determined at 310. This may involve analyzing operational data collected from the communication system by an operator, or a controller such as a DSL optimizer or other entity that assists the operator in evaluating and controlling the system. This means that, at this stage of the method 300, the operator can define, limit, set and control the "operational space" of the system, where the "operational space" includes the rules, permitted uses, characteristics, operational parameter ranges, etc. that define how users can use such a system.

In one embodiment, the relationship between data rate and service stability can be evaluated, especially in lines that have highly time-variant noise or impulse noise. In other embodiments of the present invention, other metrics and their relationships can be considered. For example, the relationship between latency and service stability or the relationship between latency and data rate can be evaluated, especially in lines that have impulse noise. Users may have preferences influenced or dictated by these types of operational characteristics and those preferences can be used to decide which parameter values and/or ranges will help address the users' preferences. Other performance metrics include time variation of data rate (that is, does the rate vary sufficiently over time to affect service), time variation of service stability and others that will be apparent to those skilled in the art.

At 320 preference data is collected from a user set, which may be a single line or multiple lines (for example, a DSL binder group). The collected user preference data can include direct user information (for example, from direct communication with users) or indirect user information (for example, from an HMM or the like). To obtain direct user information, the operator can correspond directly with the users and identify the users' preferences or otherwise assess the level of user satisfaction based on HMM models, user complaints (trouble tickets), etc. A direct user survey can pose questions such as the following regarding performance, use, user satisfaction, etc. (or these can be inferred from service history automatically, without asking the user directly, with answers to the various service questions being derived as a function of recorded occurrence frequency):

Do you frequently download files for long periods?
Do you use VoIP, network gaming programs, other latency sensitive programs?
Do you prefer higher data rate or more stable service?
Are you satisfied with current data rate?
Are you satisfied with stability of your internet connection?

Survey questions also can use ratings or other numerical input data to permit quantification of the user's preferences in analyzing the user preference data later. Direct user correspondence between operator and users can be done via phone calls (in case a user has called the user service center), email survey, web interface, etc. In case email or web interface is used, the data can be automatically processed and provided to the controller (such as DSL optimizer). As described in more detail below, user preference characteristics also can be inferred by observation of line statistics over time.

In other embodiments of the present invention, the user preferences also can be derived from user preference information in one or more of the operator's databases (for example, a subscriber accounts database). An operator can offer a suite of services from which the user may select. The user's selected service(s) and/or service selection history reside in this account database. In some embodiments, this user preference information may reside in a Service Management System (SMS) or an Order and Configuration OSS (Operations Support System). The basic area in network management regarding creation and maintenance of such databases is called "policy management."

The user preference data is analyzed at 330 to determine whether there are operational configurations that allow implementation of preferences from the user set while still permitting appropriate operation of the user set's lines. Reasonable options can be identified and generated that are applicable to the line set involved. Evaluation of these options may include considering whether various users' preferences are consistent with one another (in other words, the extent to which the users' various preferences are implementable in the user set's lines). Moreover, an operator may evaluate whether the users' preferences are consistent with the operator's operation of the system (that is, the extent to which the operator can implement user preferences without violating operational rules and/or damaging operation of the system for the operator and/or other users). For example, if some users request data rates that are so high that power levels required to provide the data rates would create severe crosstalk problems for other users, the operator may opt to not implement the user preferences. Other such considerations will be apparent to those skilled in the art.

In another embodiment of the present invention, determining the allowable operational configurations by analyzing the user preference data at 330 involves the following steps. Using known operator rules (for example, minimum reliability requirements, maximum data rate, etc.), the allowed values for one or more configurable operational parameters are identified. The selection of one or more of these values allows operation of the DSL system within the operator's constraints for reasonable, polite operation of the DSL system. As will be appreciated by those skilled in the art, the operator may set such constraints on any basis, not just politeness. For example, the operator may give a broader range of values to "premium" users who have special subscription or use privileges. The set of allowed values may represent the optimization space for selecting the value that will meet the requirements imposed by user preference. After accounting for the user preference data, the set of allowed values is further restricted to only those values that would result in system operation that meets both the user preference and the operator rules. Finally, the value of the configurable operational parameter(s) can be selected (from values within the restricted set) so that the DSL system achieves the highest performance available. In this way, the requirements of both operators and users are satisfied to the fullest extent available. Both operator rules and user preferences are taken into account to narrow the range of values for configuring the operational parameters of the DSL system.

When user preference data can be implemented without violating applicable system operation rules and operating parameters and/or without causing unreasonable problems for one or more users, for example, then at 340 the operator can set operational parameters for the selected user set (and/or other users, possibly) to implement the user preferences with regard to the first and second performance metrics. In some embodiments, the operator may implement an operational parameter vector value for a given user or group of users, where that operational parameter vector value assigns values to one or more operational parameters. Such operational parameter vectors can contain a single operational parameter value or multiple values, as will be appreciated by those skilled in the art.

The operator (or its controller such as a DSL optimizer) can configure lines properly so that some or all the user preferences are in effect until they either violate operational rules or parameters or until the user set updates the user preference data, for example when updated user preference data is collected at 320. Where the operational relationship between the first performance metric and the second performance metric evolve or otherwise change, then the method 300 might return to 310 to reconstruct that relationship information prior to collecting user preference data. In some embodiments, the operator might change the rules used for line configurations rather than directly changing the line configurations themselves. As noted above, some data collection, analysis, HMM construction, configuration, etc. can be performed by an operator's controller such as a DSL optimizer, if desired, and be implemented in an DSL system. Moreover, one or more of these methodologies can be implemented in software and/or other computer program products, as will be appreciated by those skilled in the art.

In general, Hidden Markov Models (HMMs) are stochastic signal models that use definable parameters to model complex behaviors. HMMs use a number of internal or hidden states and a defined state sequence described by state transition probabilities to model complex behaviors. The systems use outputs that are distinct from the internal states. The output, called an observable symbol, can be a scalar value representing a single input and/or input type to the HMM, or a vector quantity representing multiple inputs and/or input types. The observable symbols are used to model the HMM, as well as to generate probabilities that represent how well the HMM matches the measured data.

More specifically, a given system (such as a communication system) typically has number of internal states that are not directly observable. HMMs implemented according to embodiments of the present invention assist in determining, among other things, the current state, the next state to which the system might transition, and the probability that the system is in a given state when one or more observable symbols of the system are known. Mathematically, an HMM can be described as follows:

N: the number of hidden states.
M: the number of observable scalar or vector symbols.
A: the state-transition probability matrix of state j moving to state i in the next time period, where $a_{ij}=Pr(n_{t+1}=i|n_t=j)$, $1 \leq i, j \leq N$, and where t is the time period index and $n_t$ is the state number during time period t.
B: the observation probability distribution vector of observing symbol k while the state is j where $B_j(k)=Pr(o_t=k|n_t=j)$, $1 \leq k \leq M$, $1 \leq j \leq N$ and $o_t$ is the observed symbol during time period t.
π: the initial state distribution, $\pi_j=Pr(n_t=j)$, $1 \leq j \leq N$.
λ: the entire HMM model $\lambda=(A, B, \pi)$.

Note that one of the M symbols is observed in each time period, but the state needs to be estimated based on the observation because it is not directly observable.

In the embodiments of the present invention, one or more HMMs can be used by an operator to estimate one or more user preference data. This data might represent states such as how often a given communication line is in use and what kind of use is being made of the line (for example, VoIP and other high demand uses). In some cases, each state may be a performance metric (for example, user satisfaction with service stability), while the output relied upon may be a single operating or performance parameter value or distribution, or an operating or performance condition (for example, user/customer complaints), or a combination of parameters and/or performance characteristics.

An HMM can be selected on the basis of information available from the subject communication system and/or its users. In the case of DSL systems, there are a number of parameters and/or data available from a system MIB and/or other components of the system, as noted above and below in this disclosure. Moreover, an operator's controller such as a DSL optimizer can collect other operational data from the system via other means, as discussed in more detail herein and as known to those skilled in the art.

Embodiments of the present invention use an HMM to assist in estimating the preferences of one or more users in a user set under consideration. Various examples of embodiments of the present invention are presented herein in connection with DSL systems. However, as will be appreciated by those skilled in the art, the invention applies more generally to any communication system in which the methods, apparatus and other embodiments of the present invention can be applied.

In some embodiments of this invention, a methodology used to identify the user preferences can be viewed as being related to the algorithm area variously known as "non-supervised learning" or "clustering" or "vector quantization" (though none of these fields has been applied in a manner similar to that used in connection with embodiments of the present invention).

The following steps may be taken:
a) Observed data from a DSL link of a user with unknown user preferences are formatted into a vector x (for example, ATM cell counts, current data rate, CV violations, FEC corrections, etc.);
b) Vector x is classified into one of several clusters based on a minimum distance criterion;
c) Other DSL links of users with known user preferences belonging to the selected cluster are examined to estimate the user preferences for the DSL link of the user with unknown user preferences (for example, user preferences may indicate traffic loads, traffic type, etc.).

In some embodiments, clustering methods include separate methods for training and separate methods for the classification described above. Generic training methods related to clustering are well known to those skilled in the art (though they have not been applied to the types of situations addressed by embodiments of the present invention). An example illustrating one or more methods according to the present invention follows. Let x be the vector of observed data of the DSL link and let $y_i$, $i=1, \ldots, C$ be vectors associated with C clusters, where each cluster corresponds to a distinct user preference. The following steps are performed:
 i. Initialize vectors $y_i$, $i=1, \ldots, C$.
 ii. Perform one or more iterations to obtain new model vectors $y_i$, $i=1, \ldots, C$ based on a training set of data.
 iii. Compute the total distortion for the training set of data.
 iv. If the total distortion is smaller than some threshold, then exit; otherwise, go to step ii.

Steps ii and iii are now described in more detail.
For step ii:
 a) For each vector x belonging to the training set, find the cluster/model i for which $d(x, y_i) \leq d(x, y_j)$ for any j other than i.
 b) For each cluster, recompute $y_i$ as the mean of all vectors x of the training set that also belong to cluster/model i. "Mean" is defined here to be any appropriate averaging operation, as will be appreciated by those skilled in the art.

For step iii:
 a) Compute total distortion as $D=average[d(x,y_i)|d(x,y_i) \leq d(x,y_j), j \neq i]$. In other words, it is the average distance of each vector of the training set of data from the closest $y_i$ vector.
 b) By using the above classification stage methodology, vector x of observed data can be classified into one of C clusters, where each cluster is related to one or more specific loop characteristics (for example, a specific HMM).

Figure 4:
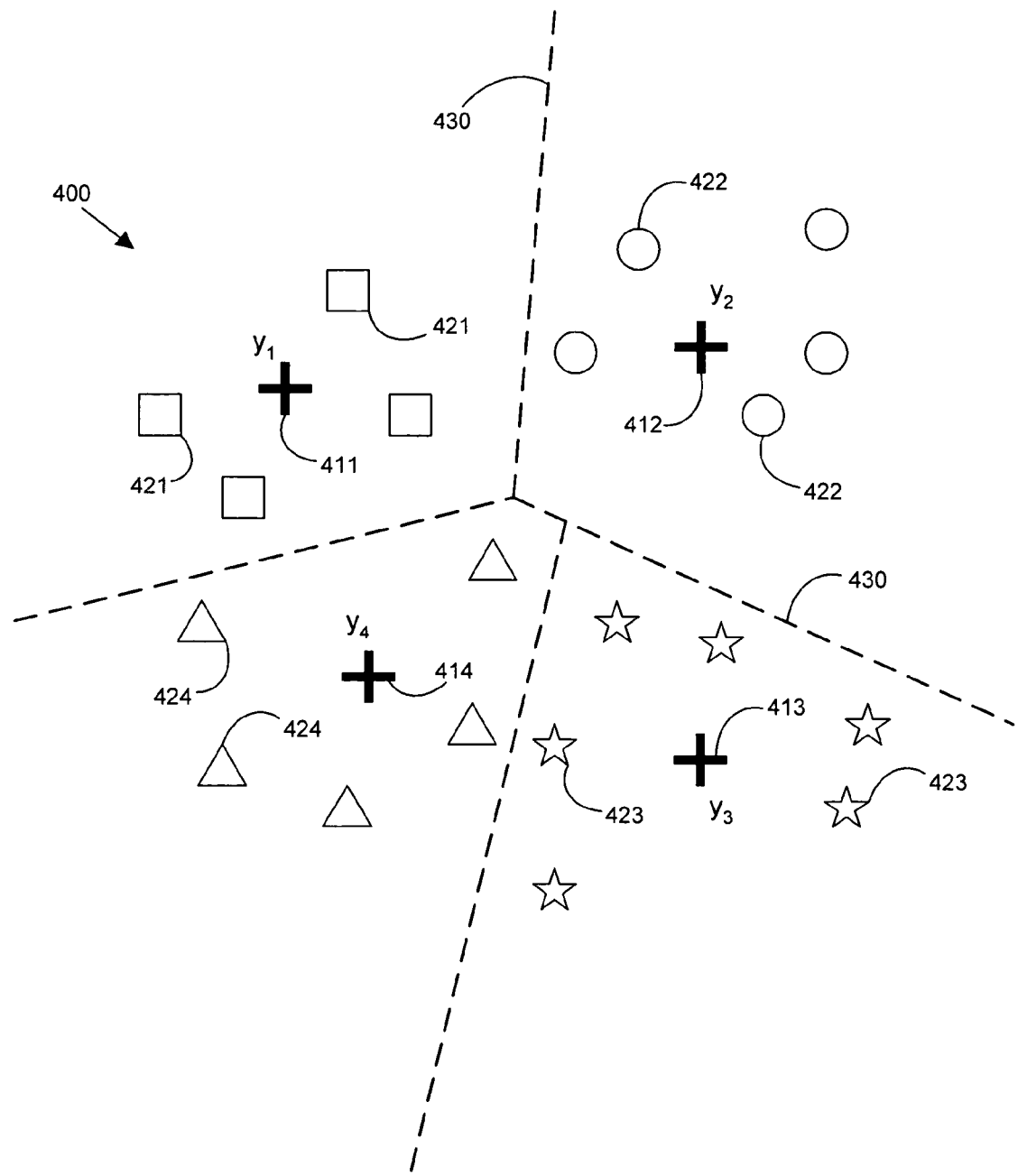
FIG. 4 is a diagram illustrating a method using clustering according to one embodiment of the present invention.

FIG. 4 illustrates one embodiment of the present invention implementing the previous example and using clusters 400 for the case of four clusters 400. Each cross 411, 412, 413, 414 corresponds to a vector $y_i$. The classification of DSL lines into clusters also is shown, where DSL lines classified into the same cluster are shown as squares 421, circles 422, stars 423 and triangles 424 bounded by the lines 430 of the FIG. 4. In these types of systems, user preference data for the DSL system can be collected determining a set of clusters corresponding to distinct user preferences. The cluster set can contain as many clusters (or cluster points) as needed to sufficiently categorized the user preferences. Operational data for the DSL system can then be collected after which a given user can be assigned to a specific cluster based on the collected operational data. The user preference data then i based on the assignment of the user to the assigned cluster.

In some embodiments of the present invention, preference data also can be obtained from data that may be stored in a user's computer, network equipment, DSL modem or the like. Such data may include network statistics (for example, ATM cell counts, packet counts, packet delay metrics, etc.), application information (for example, video decoder, entertainment system, VoIP phone, etc.) and other data that may be used to extract information about user preference.

The evaluation of whether a line and/or system should be configured, maintained or altered and/or any other evaluation of operational data according to embodiments of the present invention may be required to be based on the most recently available operational data pertaining to the operational condition or may be based on historical data as well as the current data. For example, if a noise source (for example, an appliance or other device) that has caused performance problems in the past is removed (for example, thrown away by a resident), its prior influence on the structure of an HMM and/or implementation of rules pertaining to noise from the source should be removed or at least reduced. Therefore, if historical data is used, it may be weighted in any suitable manner. For example, a data weighting vector (W) can be given to each line and/or operational condition so that the weighting of current and historical data can be applied as a function of how current the data is. For instance, if the weighting vector is W1=[1 1 1], then the data from the last three update periods (for example, days) are given equal weight in evaluating compliance. If the weighting vector is W2=[1 0 0 0 0 0 0 0.5], then the data from the last reported operational condition data is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, W3=[1 1 1 . . . 1 1 1]), using an update period of one day. Different weighting vectors can be used for different operational conditions, for example depending on whether a single reading should serve as the basis for any decision and/or change to an HMM.

In addition to the timeliness of the operational data considered, the evaluation of whether any decision should be made and/or action taken, and/or any other evaluation of operational data, may be required to be based on a sufficient quantity of available operational data. For example, in some cases, the data collection system might malfunction or be inactive, meaning that too little or no data might be available. In such cases, it might be helpful for the system to abstain from making any changes to a system and/or line operation, or any limits and/or parameters applicable thereto, when there is insufficient data on which to base reliable evaluation. To prevent an inappropriate change from being implemented, implementation of a change can be limited only to those cases when sufficient additional data has been collected since the last evaluation or within a specified time period. Operational data may be viewed using cardinality techniques and data probability distributions. Sophisticated distribution estimation might be used to reduce the influence of distant past values in favor of more recently collected data and are well understood by those skilled in the art. If a data sufficiency or timeliness rule is not satisfied, then no action may be taken until new data is collected that allows such a rule to be met.

Several examples likewise illustrate embodiments of the present invention.

EXAMPLE 1

Figure 5A:
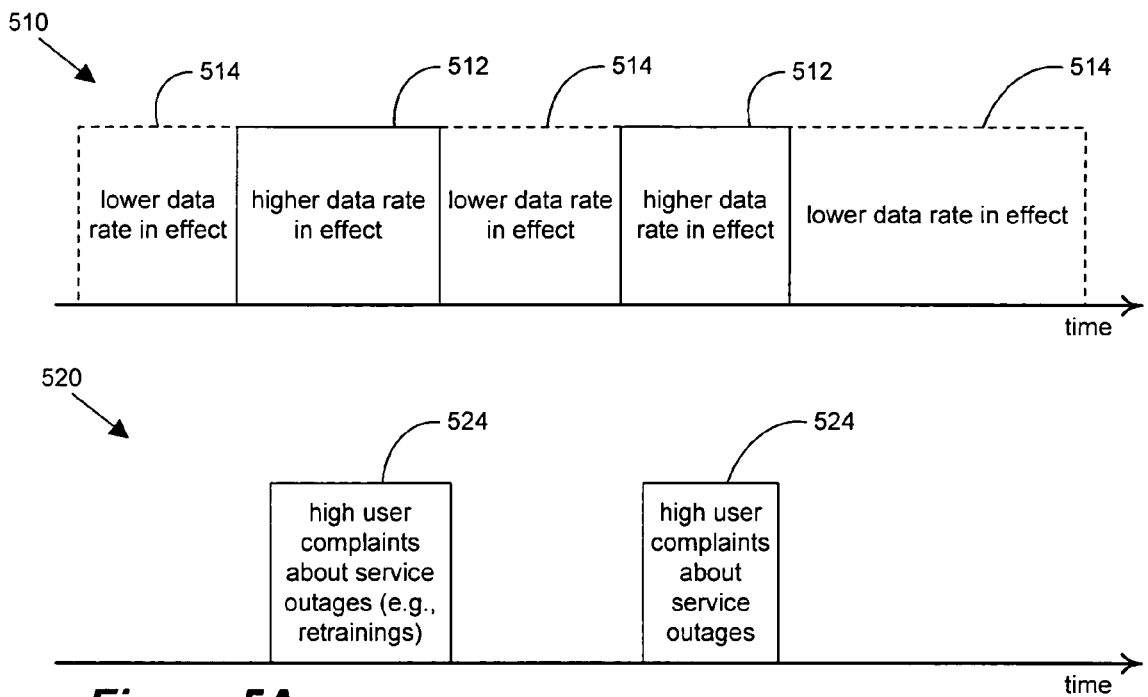
FIG. 5A is a diagram illustrating the implementation of a method according to one embodiment of the present invention.

In this example, user preference data is collected by/for an operator relating to user complaints about service outages (for example, due to retraining of DSL modems when data rates are relatively high for line conditions) and the data rates in effect during the same time period. FIG. 5A illustrates a possible relationship of these two types of data over time, for purposes of this example. Joint estimation of data rate versus service stability with an HMM is shown in timeline 520, where the user complaints are more probable in state 524 (for example, they exceed a threshold probability value) when the available user data rate shown in timeline 510 is in its "higher data rate in effect" state 512. In this case, it can be concluded that the users in this user set are less concerned with data rate speed than they are with stable service. The fact that there are no (or relatively low) user complaints when the low data rate is in effect in state 514 may or may not influence a user preference determination, though it could be interpreted in some cases as user satisfaction since there are no (or very few) complaints about service speed.

EXAMPLE 2

Figure 5B:
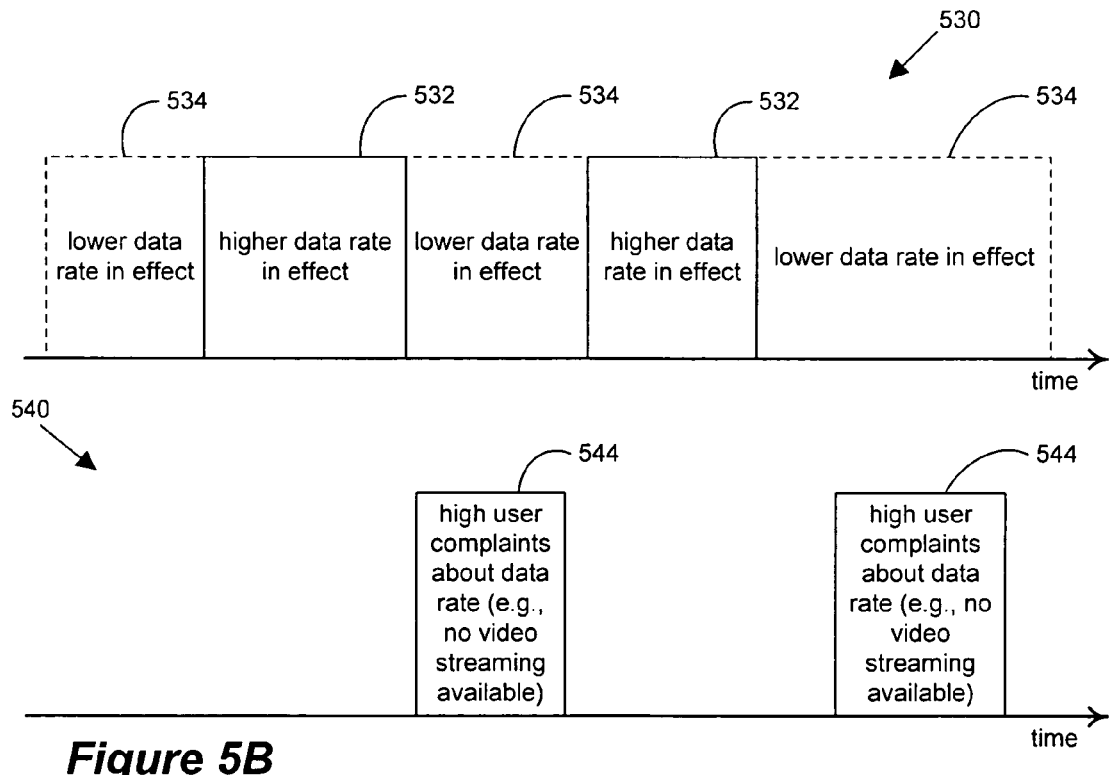
FIG. 5B is a diagram illustrating the implementation of another method according to one embodiment of the present invention.

In a variation of Example 1, and as illustrated in FIG. 5B, a model looks at user complaints regarding availability of services that require high data rates, rather than the service stability complaints of Example 1 and FIG. 5A. In timeline 530 of FIG. 5B, lower data rate periods 534 and higher data rate periods 532 again are plotted. In timeline 540 it can be seen that user complaints arise at 544 due to the unavailability of data rates that are high enough to provide one or more desired user services. In this case, an operator could surmise that the subject user set is more interested in line speed than service stability.

EXAMPLE 3

Users may indicate a desire to purchase a higher data rate service for a prescribed/limited amount of time. Through a web-interface, users can order upgraded DSL service for order a limited period (1 hour~1 day) of rate increase. A DSL optimizer or other controller can subsequently change the DSL system configuration to allow the higher data rate. The corresponding reduction of rate after the specified period has expired is also scheduled through the DSL optimizer, controller, etc. Such capability can be provided by taking advantage of the Seamless Rate Adaptation (SRA) feature of ADSL2/2+ and VDSL2, in which case the upshift and downshift margins associated with SRA can be adapted during SHOWTIME to steer the connection toward higher or lower data rates. Alternatively, the rate change may be enabled by forcing a retrain.

EXAMPLE 4

The user preferences may include preference toward using the DSL service with specific applications that are characterized by known traffic types. Knowledge of user preference may thus be exploited to tune configurable parameters of network protocols (such as TCP, UDP, RTP). Such tuning would aim to improve transmission for the traffic types most often associated with the user. Network protocol statistics such as packet loss, throughput, buffer sizes, etc. also can be combined with knowledge of user preference to configure DSL physical layer parameters such as latency settings and impulse noise protection.

Figure 6A:
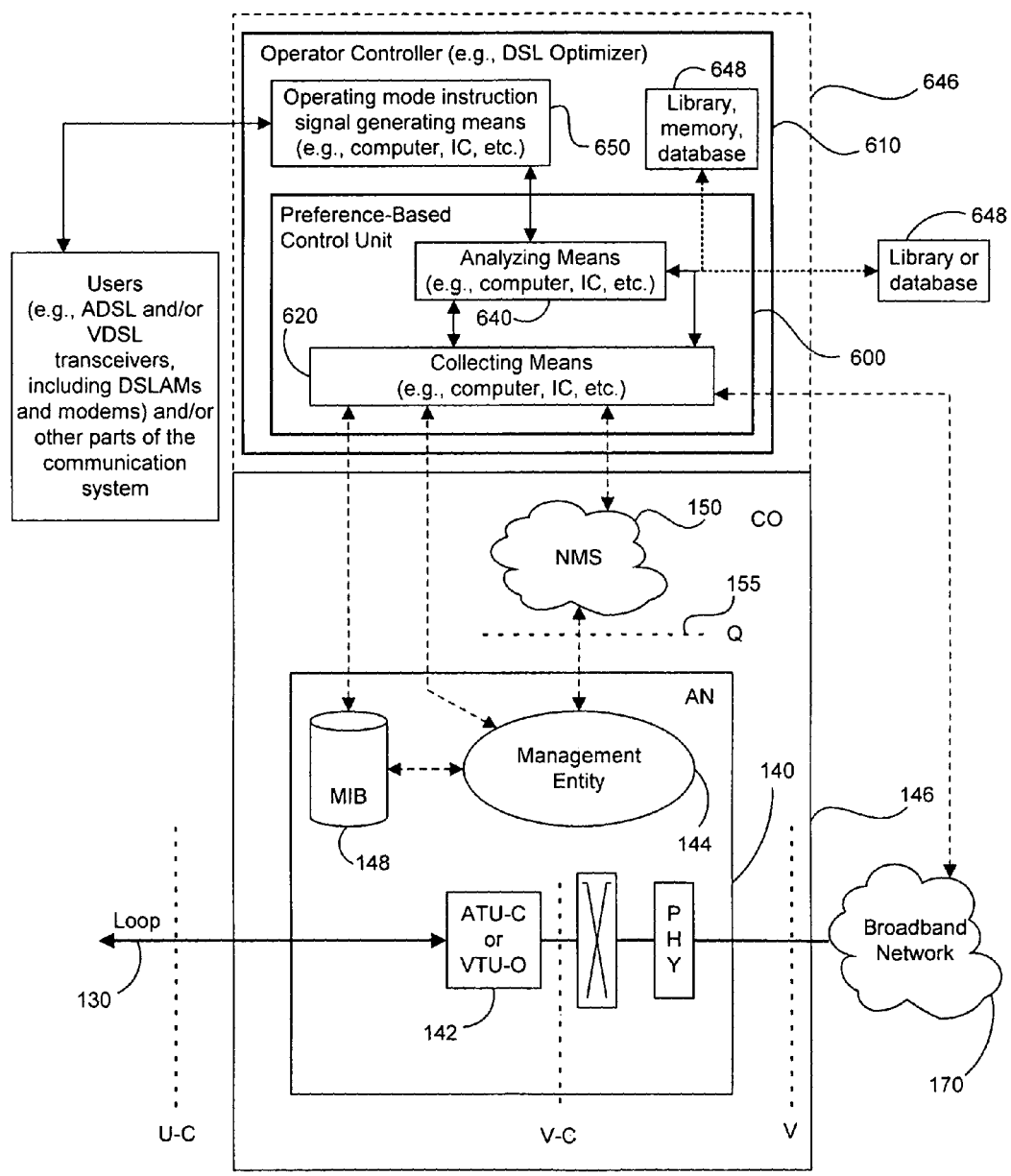
FIG. 6A is a controller including an operator-controlled user-preference-based control unit according to the present invention.

According to one embodiment of the present invention shown in FIG. 6A, a preference-based control unit 600 may be part of or be coupled to an operator coupled to a DSL or other communication system. A controller 610 (for example, a device functioning as or with an operator's DSL optimizer, DSM server, DSM Center or a dynamic spectrum manager) assists operators in operating and, perhaps, optimizing use of the system. (A DSL optimizer may also be referred to as a dynamic spectrum manager, Dynamic Spectrum Management Center, DSM Center, Spectrum Maintenance Center or SMC.) In some embodiments, the controller 610 may be a completely independent entity, while in other embodiments the controller 610 may be part of an ILEC or CLEC operating a number of DSL lines from a telco CO or other location. As seen from the dashed line 646 in FIG. 6A, the controller 610 may be in the CO 146 or may be external to CO 146. Moreover, controller 610 may be coupled to and/or controlling DSL and/or other communication lines in multiple COs.

The operator's preference-based control unit 600 includes a data collection unit 620 identified as a collecting means and an analysis unit 640 identified as analyzing means. As seen in FIG. 6A, the collecting means 620 (which can be a computer, processor, IC, computer module, etc. of the type generally known) may be coupled to NMS 150, ME 144 at AN 140 and/or the MIB 148 maintained by ME 144, any or all of which may be part of a DSL system for example. Data also may be collected through the broadband network 170 (for example, via the TCP/IP protocol or other protocol or means outside the normal internal data communication within a given DSL system). One or more of these connections allows the preference-based control unit 600 to collect operational data from the system and, if appropriate, elsewhere. Data may be collected once or over time. In some cases, the collecting means 620 will collect on a periodic basis, though it also can collect data on-demand or any other non-periodic basis (for example, when a DSLAM or other component sends data to the preference-based control unit), thus allowing the preference-based control unit 600 to update its information, operation, etc., if desired. Data collected by means 620 is provided to the analyzing means 640 (which also can be a computer, processor, IC, computer module, etc. of the type generally known) for analysis and any decision regarding user preferences concerning one or more performance metrics, the construction and/or modification of one or more HMMs to be used in estimating user preferences, defining operational parameters that will permit implementation of user-preferred performance metrics to the extent possible, etc. in the communication system.

In the exemplary system of FIG. 6A, the analyzing means 640 is coupled to a signal generating means 650 in the operator's controller 610. This signal generator 650 (which can be a computer, processor, IC, computer module, etc.) is configured to generate and send instruction signals to modems and/or other components of the communication system (for example, users' DSL transceivers and/or other equipment, components, etc. in the system). These instructions may include instructions regarding data rates, transmit power levels, coding and latency requirements, retraining scheduling and implementation, system configuration instructions, direct requests for user preference data and/or other data, etc. The instructions may be generated after the controller 610 determines whether one or more user preferences can be implemented in a given communication system coupled to the controller 610.

Embodiments of the present invention can utilize a database, library or other collection of data pertaining to data collected (including user preference data, operational space data, historical data regarding collected operational data and the like and other types of data), previously constructed HMMs, etc. This collection of reference data may be stored by the operator, for example, as a library 648 (for example, a database or memory) in or available to the controller 610 of FIG. 6A and used by the analyzing means 640, collecting means 620, etc. An operator may also store library, memory and/or database information at a location outside the controller, from which the controller may access the data. This is true, too, with the library/database/memory 675 of FIG. 6B.

In some embodiments of the present invention, the preference-based control unit 600 may be implemented in one or more computers such as PCs, workstations or the like and/or in one or more computer program products. The collecting means 620 and analyzing means 640 may be software modules, hardware modules or a combination of both, as will be appreciated by those skilled in the art. When working with a large numbers of modems, lines, users, etc., databases may be introduced and used to manage the volume of data collected.

Figure 6B:
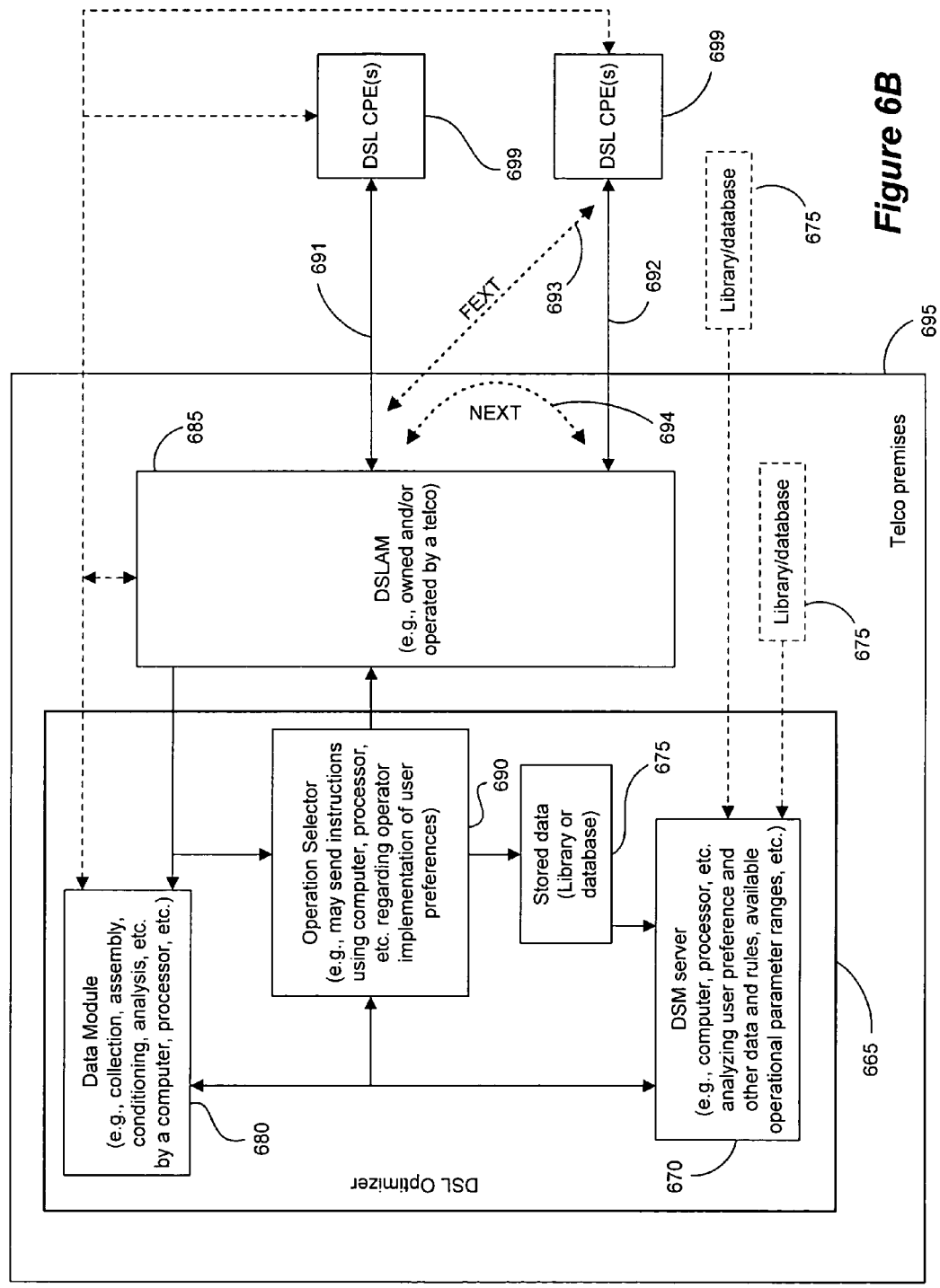
FIG. 6B is a DSL optimizer implementing a controller including an operator-controlled user-preference-based control unit according to the present invention.

Another embodiment of the present invention is shown in FIG. 6B. An operator's DSL optimizer 665 operates on and/or in connection with a DSLAM 685 or other upstream-end DSL system component (for example, an RT, ONU/LT, etc.), either or both of which may be on the premises 695 of a telecommunication company (a "telco"). The operator's DSL optimizer 665 includes a data module 680, which can collect, assemble, condition, manipulate and/or supply user preference data, operational data, etc. for and to the DSL optimizer 665. Module 680 can be implemented in one or more computers such as PCs or the like. Data from module 680 is supplied to a DSM server module 670 for analysis (for example, determining the operational relationship between various performance metrics, analyzing collected user preference data, analyzing possible operational parameter ranges and values that will permit implementation of user preferences, etc.). Information also may be available from a library or database 675 that may be related or unrelated to the telco.

An operation selector 690 may be used to implement signals affecting operation of the communication system. Such decisions may be made by the DSM server 670 or in any other suitable manner, as will be appreciated by those skilled in the art. Operational modes selected by selector 690 are implemented in the DSLAM 685 and/or any other appropriate DSL system component equipment. Such equipment may be coupled to DSL equipment such as customer premises equipment 699. Device 685 can be used to implement any ordered changes based on user preference data (direct or indirect) evaluated by the DSL optimizer 665. The system of FIG. 6B can operate in ways analogous to the system of FIG. 6A, as will be appreciated by those skilled in the art, though differences are achievable while still implementing embodiments of the present invention.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
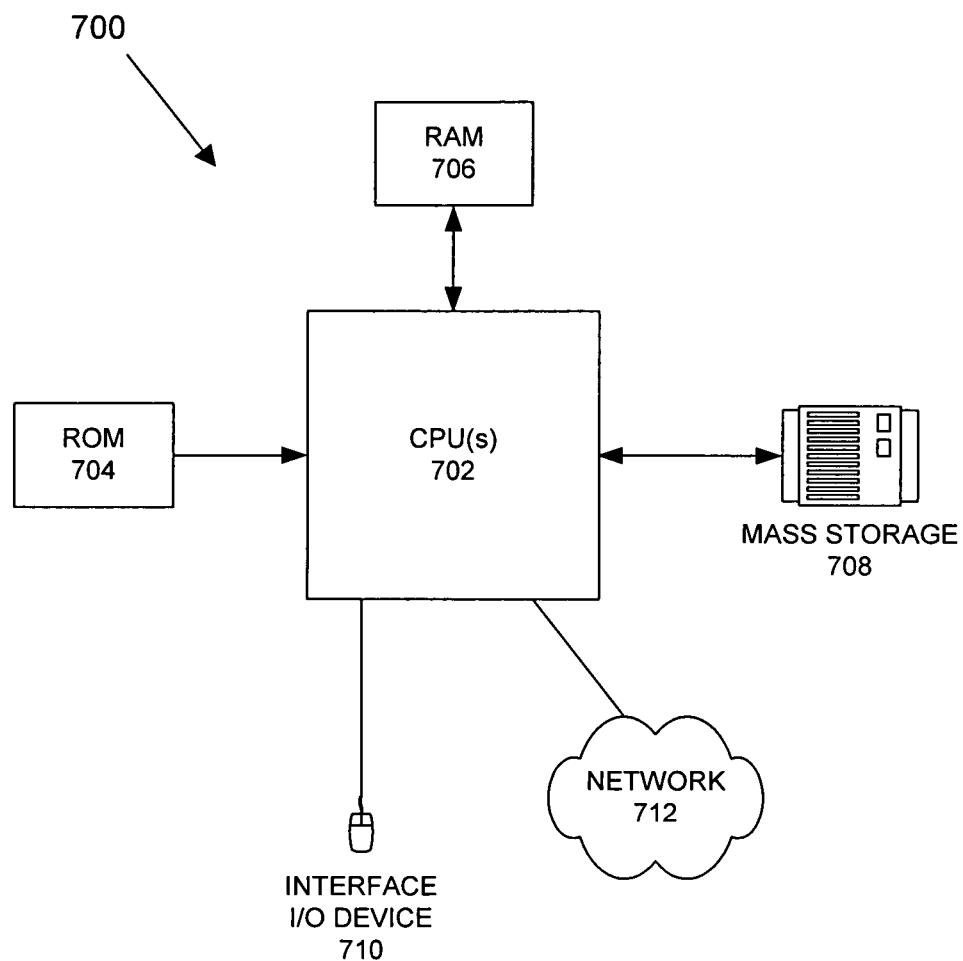
FIG. 7 is a block diagram of a typical computer system or integrated circuit system suitable for implementing embodiments of the present invention.

FIG. 7 illustrates a typical computer system that can be used by a user and/or controller in accordance with one or more embodiments of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 also is coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 also is coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 708 or 714 and executed on CPU 702 in conjunction with primary memory 706. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method comprising:
    operating a Digital Subscriber Line (DSL) system, the method limited to digital communication over existing telephone subscriber lines in accordance with defined operational characteristics and parameters;
    determining an operational relationship between a first performance metric relating to the operation of the DSL system and a second performance metric relating to the operation of the DSL system;
    collecting DSL customer data indicating a DSL customer's preferences for operation of a DSL service provided to the DSL customer via the DSL system, wherein the collected DSL customer data includes direct user information and indirect user information;
    evaluating the DSL customer's preferences;
    generating an operational parameter vector value to implement the DSL customer's preferences with regard to the first and second performance metrics in accordance with the defined operational characteristics and parameters of the DSL system; and
    implementing the generated operational parameter vector value into the DSL system to adjust the DSL service provided to the DSL customer of the DSL system.

2. The method of claim 1 wherein:
    collecting the DSL customer data indicating the DSL customer's preferences for operation of the DSL service provided to the DSL customer via the DSL system comprises receiving DSL customer data indicating the DSL customer's preference for one of the first performance metric of the DSL system and the second performance metric of the DSL system, wherein an operational adjustment to the first performance metric effects a change in the second performance metric.

3. The method of claim 1 wherein collecting the DSL customer data is based on at least one of the following:
    conducting a user survey;
    sending an email questionnaire;
    obtaining user feedback via user calls;
    using a web interface; or
    obtaining direct user feedback.

4. The method of claim 1 wherein collecting the DSL customer data comprises:
    obtaining a Hidden Markov Model (HMM) representing a stochastic signal model that uses definable parameters to model complex behavior;
    collecting operational data from the DSL system;
    using the collected operational data to determine an HMM internal state; and
    using the HMM internal state to derive the operational user preferences from the DSL customer data.

5. The method of claim 1 wherein collecting the DSL customer data comprises:
    determining a set of clusters corresponding to distinct user operational preferences, wherein the set of clusters comprises a first cluster;
    collecting operational data from the DSL system;
    assigning the DSL customer associated with the DSL customer data to the first cluster based on the collected operational data; and
    generating the operational parameter vector value reflecting the DSL customer's preferences based on the assignment of the DSL customer to the first cluster.

6. The method of claim 1 wherein collecting the DSL customer data comprises querying a database to obtain the DSL customer's preferences.

7. The method of claim 1 wherein evaluating the DSL customer data comprises:
    determining an operational parameter vector to be configured;
    identifying a set of allowed vector values of the operational parameter vector, wherein each vector value in the set of allowed vector value complies with the defined operational characteristics and parameters constituting a defined operational space;
    limiting the set of allowed vector values of the operational parameter vector to comply with the DSL customer's preferences; and
    determining an optimization vector value of the operational parameter vector from within the limited set of allowed vector values that achieves a target performance level.

8. The method of claim 1 further comprising retraining the DSL system prior to implementing the operational parameter vector value to adjust the DSL service provided to the DSL customer of the DSL system.

9. The method of claim 1 wherein evaluating the DSL customer's preferences comprises:
    collecting operational data of the DSL system; and
    determining the feasibility of implementing one or more of the DSL customer's preferences reflected in the DSL customer data in light of the collected operational data of the DSL system.

10. The method of claim 9 wherein collecting operational data of the DSL system comprises at least one of the following:
    applying a weighting factor to the collected operational data;
    performing a sufficiency check on the collected operational data; and
    performing a timeliness check on the collected operational data.

11. A non-transitory computer readable storage medium having instructions store thereon that, when executed by a processor, cause the processor to perform a method comprising:
    operating a Digital Subscriber Line (DSL) system, the method limited to digital communication over existing telephone subscriber lines in accordance with defined operational characteristics and parameters;
    determining an operational relationship between a first performance metric relating to the operation of the DSL system and a second performance metric relating to the operation of the DSL system;
    collecting DSL customer data indicating a DSL customer's preferences for operation of a DSL service provided to a the DSL customer via the DSL system, wherein the collected DSL customer data includes direct user information and indirect user information;
    evaluating the DSL customer's preferences;
    generating an operational parameter vector value to implement the DSL customer's preferences with regard to the first and second performance metrics in accordance with the defined operational characteristics and parameters of the DSL system; and
    implementing the generated operational parameter vector value into the DSL system to adjust the DSL service provided to the DSL customer of the DSL system.

12. A Digital Subscriber Line (DSL) system comprising:
an operator database defining one or more operational characteristics and parameters of the DSL system and an operational relationship between a first performance metric and a second performance metric; and
a controller to affect operation of the DSL system for a DSL service provided to a DSL customer via the DSL system, wherein operation of the DSL service is limited to digital communication over existing telephone subscriber lines associated with the DSL customer;
wherein the controller comprises:
  a data collection unit to collect DSL customer data that indicates the DSL customer's preferences for operation of the DSL service provided to the DSL customer via the DSL system, wherein the collected DSL customer data includes direct user information and indirect user information;
  an analysis unit coupled to the collection unit to evaluate the DSL customer's preferences;
  a control signal generator to generate an operational parameter vector value to implement the DSL customer's preferences with regard to the first and second performance metrics in accordance with the defined one or more operational characteristics and parameters of the DSL system; and
  wherein the controller is to send the control signals to the DSL system to adjust the DSL service provided to the DSL customer of the DSL system.

13. The controller of claim 12 wherein the data collection unit to collect the DSL customer data comprises the data collection unit to:
  obtain a Hidden Markov Model (HMM) representing a stochastic signal model that uses definable parameters to model complex behavior;
  collect operational data from the DSL system;
  determine an HMM internal state from the collected operational data; and
  derive the DSL customer's preferences for the DSL service provided to the DSL customer of the DSL system based on the HMM internal state.

14. The controller of claim 12 wherein the data collection unit is to:
  determine a set of clusters corresponding to distinct operational user preferences, wherein the set of clusters comprises a first cluster;
  collect operational data for the DSL system;
  assign the DSL customer associated with the DSL customer data to the first cluster based on the collected operational data; and
  generate the control signals implementing at least a portion of the DSL customer's preferences based on the assignment of the DSL customer to the first cluster.

15. The controller of claim 12 wherein the collection unit is to query a subscriber account database to obtain the DSL customer data.

16. The controller of claim 12 wherein the analysis unit is to:
  determine an operational parameter vector to be configured;
  identify a set of allowed values of the operational parameter vector, wherein each value in the set of allowed values complies with a set of operator rules;
  limit the set of allowed values of the operational parameter vector to comply with the DSL customer's preferences; and
  determine an optimization value of the operational parameter vector from within the limited set of allowed values that achieves a target performance level relative to the DSL customer's preferences.

17. The controller of claim 12 wherein the control signal generator is to send a retrain signal to the DSL system.

18. The controller of claim 17 wherein the control signal generator is to send a retrain signal to the DSL system only if a traffic level of the DSL system is below a threshold.

19. The controller of claim 12 wherein the data collection unit is to further collect operational data from the DSL system, and wherein the controller is to further perform at least one of the following:
  apply a weighting factor to the collected operational data;
  perform a sufficiency check on the collected operational data;
  perform a timeliness check on the collected operational data;
  apply a weighting factor to the DSL customer's preferences;
  perform a sufficiency check on the DSL customer's preferences;
  perform a timeliness check on the DSL customer's preferences;
  apply a weighting factor to the collected operational data;
  perform a sufficiency check on the collected operational data; or
  perform a timeliness check on the collected operational data.

20. The controller of claim 12 further comprising the operator database.

* * * * *